US 9,229,783 B2

(12) United States Patent
Benedetti et al.

(10) Patent No.: US 9,229,783 B2
(45) Date of Patent: Jan. 5, 2016

(54) METHODS AND APPARATUS FOR RESOURCE CAPACITY EVALUATION IN A SYSTEM OF VIRTUAL CONTAINERS

(75) Inventors: Fabio Benedetti, Rome (IT); Norman Bobroff, Katonah, NY (US); Liana Liyow Fong, Irvington, NY (US); Yanbin Liu, New Haven, CT (US); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/751,089

(22) Filed: Mar. 31, 2010

(65) Prior Publication Data

US 2011/0247005 A1 Oct. 6, 2011

(51) Int. Cl.
*G06F 9/46* (2006.01)
*G06F 9/50* (2006.01)

(52) U.S. Cl.
CPC ...... *G06F 9/5077* (2013.01); *G06F 2209/5022* (2013.01)
USPC .......................................................... 718/105

(58) Field of Classification Search
None
See application file for complete search history.

(56) References Cited

U.S. PATENT DOCUMENTS

| 5,898,870 | A  | 4/1999 | Okuda et al. |
| 6,427,152 | B1 | 7/2002 | Mummert et al. |
| 6,697,373 | B1 | 2/2004 | Sandstrom |
| 7,028,158 | B1 | 4/2006 | Beatty et al. |
| 2003/0163512 | A1 | 8/2003 | Mikamo |
| 2005/0175004 | A1 | 8/2005 | Russell et al. |
| 2006/0020944 | A1* | 1/2006 | King et al. ............ 718/104 |
| 2006/0029054 | A1 | 2/2006 | Breh et al. |
| 2007/0143758 | A1 | 6/2007 | Coppinger et al. |
| 2007/0256077 | A1 | 11/2007 | Zhong |
| 2008/0022284 | A1* | 1/2008 | Cherkasova et al. ...... 718/104 |
| 2008/0028408 | A1 | 1/2008 | Day et al. |

(Continued)

FOREIGN PATENT DOCUMENTS

WO  2009059377 A1  5/2009

OTHER PUBLICATIONS

Wang et al., "Capacity and Performance Overhead in Dynamic Resource Allocation to Virtual Containers," In Proc. of the IFIP/IEEE Symposium on Integrated Management, p. 226 (2007).

(Continued)

*Primary Examiner* — Mengyao Zhe
(74) *Attorney, Agent, or Firm* — Ryan, Mason & Lewis, LLP

(57) ABSTRACT

Methods and apparatus are provided for evaluating potential resource capacity in a system where there is elasticity and competition between a plurality of containers. A dynamic potential capacity is determined for at least one container in a plurality of containers competing for a total capacity of a larger container. A current utilization by each of the plurality of competing containers is obtained, and an equilibrium capacity is determined for each of the competing containers. The equilibrium capacity indicates a capacity that the corresponding container is entitled to. The dynamic potential capacity is determined based on the total capacity, a comparison of one or more of the current utilizations to one or more of the corresponding equilibrium capacities and a relative resource weight of each of the plurality of competing containers. The dynamic potential capacity is optionally recalculated when the set of plurality of containers is changed or after the assignment of each work element.

14 Claims, 7 Drawing Sheets

|  |  | $VM_1$ | $VM_2$ | $VM_3$ |
|---|---|---|---|---|
| 610 | RESERVATION ($res_i$) | 0.3 | 0.3 | 0.3 |
| 620 | SHARE ($w_i$) | 1 | 2 | 3 |
| 630 | UTILIZATION ($u_i$) | 0.4 | 0.3 | 0.25 |
| 640 | $c_i^e(1, \{VM_1, VM_2, VM_3\})$ | $0.3 + \frac{0.1}{6} = 0.317$ | $0.3 + \frac{2*0.1}{6} = 0.333$ | $0.3 + \frac{3*0.1}{6} = 0.35$ |
| 650 | $c_i^e(0.75, \{VM_1, VM_2\})$ | $0.3 + \frac{0.15}{3} = 0.35$ | $0.3 + \frac{2*0.15}{3} = 0.4$ |  |
| 660 | $c_i^e(0.7, \{VM_1, VM_3\})$ | $0.3 + \frac{0.1}{4} = 0.325$ |  | $0.3 + \frac{3*0.1}{4} = 0.375$ |
| 670 | POTENTIAL CAPACITY ($c_i$) | $1 - 0.3 - 0.25 = 0.45$ | 0.4 | 0.375 |
| 680 | FREE CAPACITY ($c_i^f$) | 0.05 | 0.1 | 0.125 |

600

(56) References Cited

U.S. PATENT DOCUMENTS

| | | |
|---|---|---|
| 2008/0320284 A1 | 12/2008 | Grzywna et al. |
| 2009/0064162 A1 | 3/2009 | Amin |
| 2009/0158275 A1 | 6/2009 | Wang et al. |
| 2011/0314465 A1 | 12/2011 | Smith et al. |

OTHER PUBLICATIONS

Sodan A., "Adaptive Scheduling for QoS Virtual Machines Under Different Resource Availability: First Experiences", JSSPP 2009, LNCS, vol. 5798, pp. 259-279; (2009).

Sodan et al., "Adaptive Time/Space Sharing wiht SCOJO", 18th International Symposium on High Performance Computing Systems and Applications, pp. 156-176, May 16-19, 2004.

Liang et al., "Related Task Scheduling Research Based on Virtual Clusters and Partitioning of Task," Scalcom-embeddedcom, Int'l Conf. on Scalable Computing and Communications; 8th Int'l Conf. on Embedded Computing; pp. 131-136 (2009).

\* cited by examiner

FIG. 5

```
1   GetCapacity(idx, pCap, u_i, res_i, lmt_i, w_i) {
2     (c_i^e) = EquilibriumPoint(pCap, res_i, lmt_i, w_i);
3     u_idx = inf;
4     unchgG = {k | u_k ≤ c_k^e}; workG = {k | u_k > c_k^e};
5     do {
6       (c_i^e) = EquilibriumPoint(pCap - Σ_{k∈unchgG} u_k, res_i, lmt_i, w_i), where i ∈ workG;
7       incG = {k | u_k ≤ c_k^e and k ∈ workG}; workG = {k | u_k > c_k^e and k ∈ workG};
8       unchgG += incG;
9     } while (incG not empty and {idx} ⊂ workG);
10    if (workG = {idx})
11      return c_idx = max{pCap - Σ_{k≠idx} u_k, lmt_idx};
12    else
13      return c_idx = c_idx^e;
14  }
```

| | $VM_1$ | $VM_2$ | $VM_3$ |
|---|---|---|---|
| 610 — RESERVATION ($res_i$) | 0.3 | 0.3 | 0.3 |
| 620 — SHARE ($w_i$) | 1 | 2 | 3 |
| 630 — UTILIZATION ($u_i$) | 0.4 | 0.3 | 0.25 |
| 640 — $c_i^e(1, \{VM_1, VM_2, VM_3\})$ | $0.3 + \frac{0.1}{6} = 0.317$ | $0.3 + \frac{2*0.1}{6} = 0.333$ | $0.3 + \frac{3*0.1}{6} = 0.35$ |
| 650 — $c_i^e(0.75, \{VM_1, VM_2\})$ | $0.3 + \frac{0.15}{3} = 0.35$ | $0.3 + \frac{2*0.15}{3} = 0.4$ | |
| 660 — $c_i^e(0.7, \{VM_1, VM_3\})$ | $0.3 + \frac{0.1}{4} = 0.325$ | | $0.3 + \frac{3*0.1}{4} = 0.375$ |
| 670 — POTENTIAL CAPACITY ($c_i$) | $1 - 0.3 - 0.25 = 0.45$ | 0.4 | 0.375 |
| 680 — FREE CAPACITY ($c_i^f$) | 0.05 | 0.1 | 0.125 |

600

METHODS AND APPARATUS FOR RESOURCE CAPACITY EVALUATION IN A SYSTEM OF VIRTUAL CONTAINERS

FIELD OF THE INVENTION

The present invention relates generally to the electrical, electronic and computer arts, and, more particularly, to the dynamic capacity of resources for platforms with virtualization support.

BACKGROUND OF THE INVENTION

When computer resources are shared, a scheduler assigns processes to one or more available processors or other resources. Typically, the scheduler assigns work, such as batch jobs, by matching job requirements with the capabilities and capacity of the resource(s). Traditionally, jobs have been assigned directly to physical resources, based on current utilization and fixed capacity. More recently, however, the physical resources are exposed through one or more resource containers (often referred to as "virtual machines"), each providing an abstraction of the underlying resources. The shared physical resources can include, for example, processing cores, storage systems, and network communication resources.

In a multi-container environment, the various containers share and compete for fixed physical resources, such as processor cycles, typically under the supervision of a container manager. The container manager typically assigns the physical resources to containers according to a set of rules or policies. The resource competition between containers adds even greater complexity to the scheduling problem. The evaluation of the resource capacity of the containers is a key step in any scheduling process. In addition, containers may be added, removed, suspended or brought online while work is executing. Planning these actions and assessing the impact on existing containers and jobs is also an important activity. In a multi-container environment, however, the evaluation of the resource capacity is challenging.

A need therefore exists for methods and apparatus for evaluating the resource capacity in a system of virtual containers. A further need exists for methods and apparatus for evaluating the dynamic resource capacity across all virtual containers sharing physical capacity.

SUMMARY OF THE INVENTION

Generally, methods and apparatus are provided for evaluating potential resource capacity (for example, for a job assignment) in a system where there is elasticity and competition between a plurality of containers, such as virtual machines. According to one aspect of the invention, a dynamic potential capacity is determined for at least one container in a plurality of containers competing for a total capacity of a larger container. A current utilization by each of the plurality of competing containers is obtained, and an equilibrium capacity is determined for each of the competing containers. The equilibrium capacity indicates a capacity that the corresponding container is entitled to. The dynamic potential capacity is determined based on the total capacity, a comparison of one or more of the current utilizations to one or more of the corresponding equilibrium capacities and a relative resource weight of each of the plurality of competing containers.

According to another aspect of the invention, the dynamic potential capacity is optionally recalculated when the set of plurality of containers is changed or after the assignment of each work element. The determined dynamic potential capacity can be employed, for example, for container migration between a plurality of parent containers or for work assignment.

In one exemplary embodiment, the plurality of containers are separated into at least two groups. An overutilized group comprises containers having a utilization that exceeds a global equilibrium capacity and an underutilized group comprises containers having a utilization below the global equilibrium capacity. The dynamic potential capacity of the overutilized group can be computed as a difference between the total capacity and a sum of capacity of members in an underutilized group. Members of the overutilized group having a utilization below a threshold are moved to the underutilized group.

A more complete understanding of the present invention, as well as further features and advantages of the present invention, will be obtained by reference to the following detailed description and drawings.

BRIEF DESCRIPTION OF THE DRAWINGS

FIG. 5 illustrates exemplary pseudo code for an embodiment of a potential capacity evaluation process incorporating features of the present invention;

FIG. 6 provides an example for an allocation of resources for an exemplary set of three containers;

DETAILED DESCRIPTION OF PREFERRED EMBODIMENTS

Figure 1:
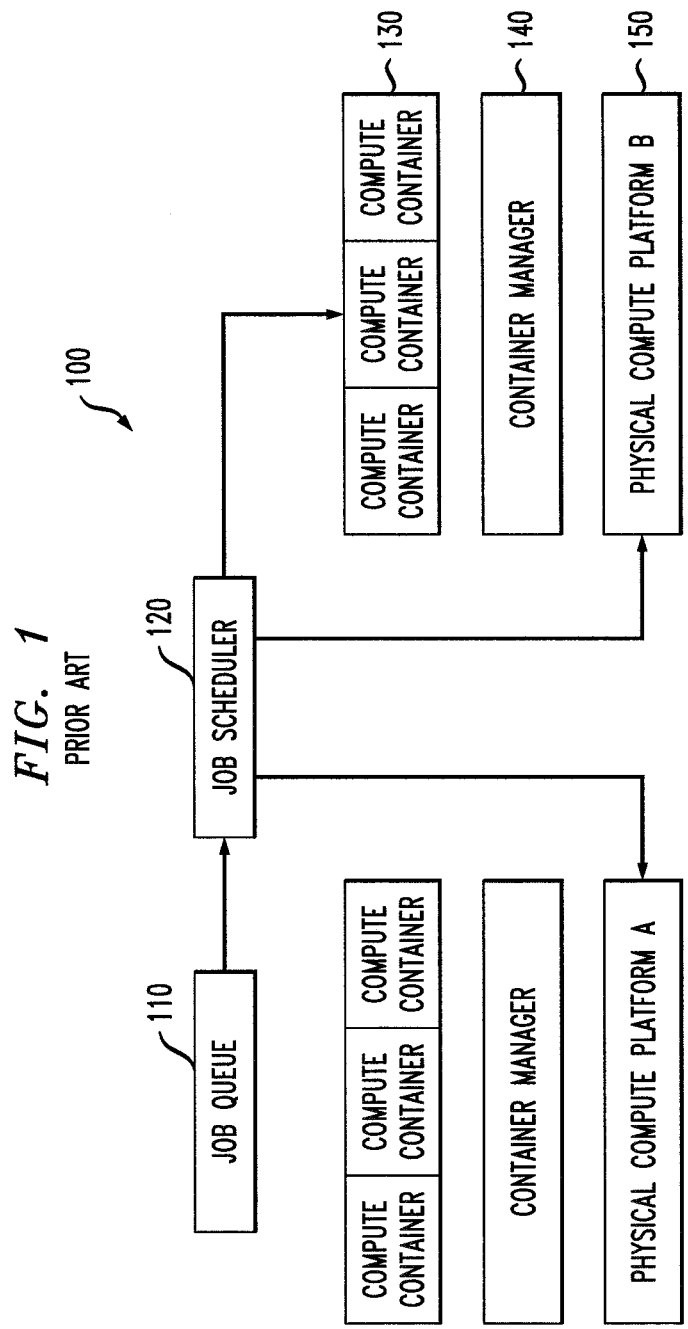
FIG. 1 provides an overview of a conventional exemplary job scheduler.

The present invention provides methods and apparatus for evaluating potential resource capacity (for example, for a job assignment) in a system where there is elasticity and competition between a plurality of containers (e.g., virtual machines). FIG. 1 provides an overview of a conventional exemplary job scheduler 100. As shown in FIG. 1, one or more jobs stored in a job queue 110 are processed by a job scheduler 120 to assign each given job to one or more available physical resources, such as physical compute platforms 150. The physical resources 150 may comprise, for example, processing cores, storage systems, and network communication resources. As previously indicated, the scheduler 120 assigns jobs by matching job requirements with the capabilities and capacity of the resources 150.

As shown in FIG. 1, the physical resources 150 are exposed through one or more resource containers 130, each providing an abstraction of the underlying resources 150. The exemplary containers 130 typically share these underlying physical resources 150 under supervision of a container manager 140. The containers 130 often compete with one another for the underlying resources 150.

Figure 2:
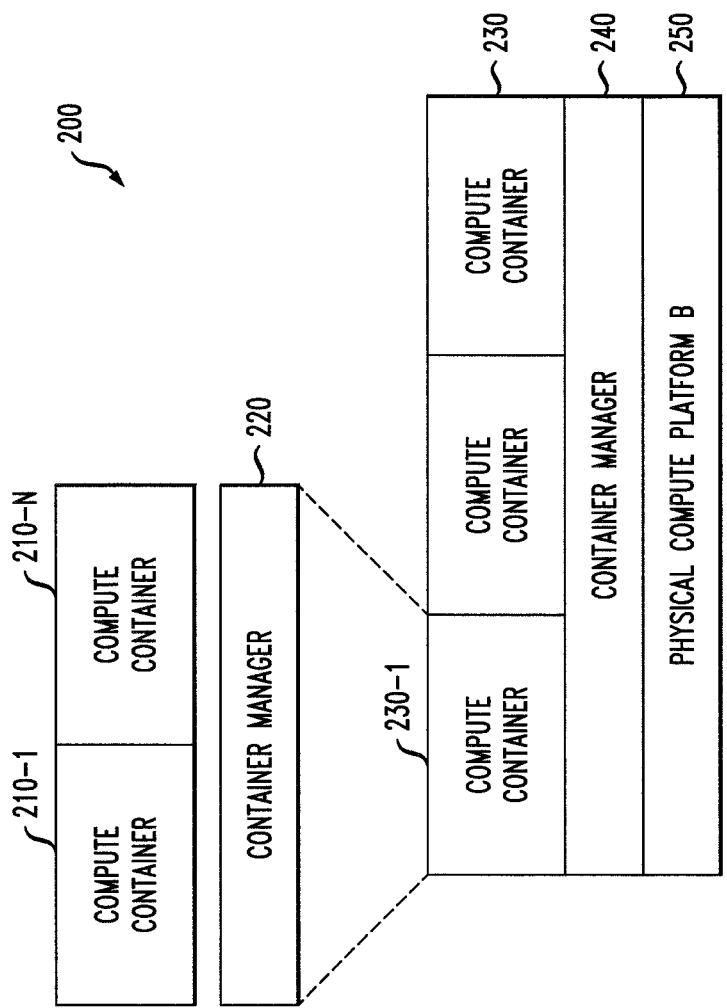
FIG. 2 provides an overview of an alternative conventional exemplary job scheduler.

The job scheduler 100 of FIG. 1 employs a single layer of containers 130. FIG. 2 provides an overview of an alternative conventional exemplary job scheduler 200. As shown in FIG. 2, a particular container, such as container 230-1, can host one or more additional containers 210-1 through 210-N and one or more container managers 220.

The present invention recognizes that in a multi-container environment, the various containers 130, 230 share and compete for fixed platform resources 150, 250. The evaluation of the resource capacity of the containers 130, 230 is a key step in the scheduling process performed by the scheduler 120.

Figure 3:
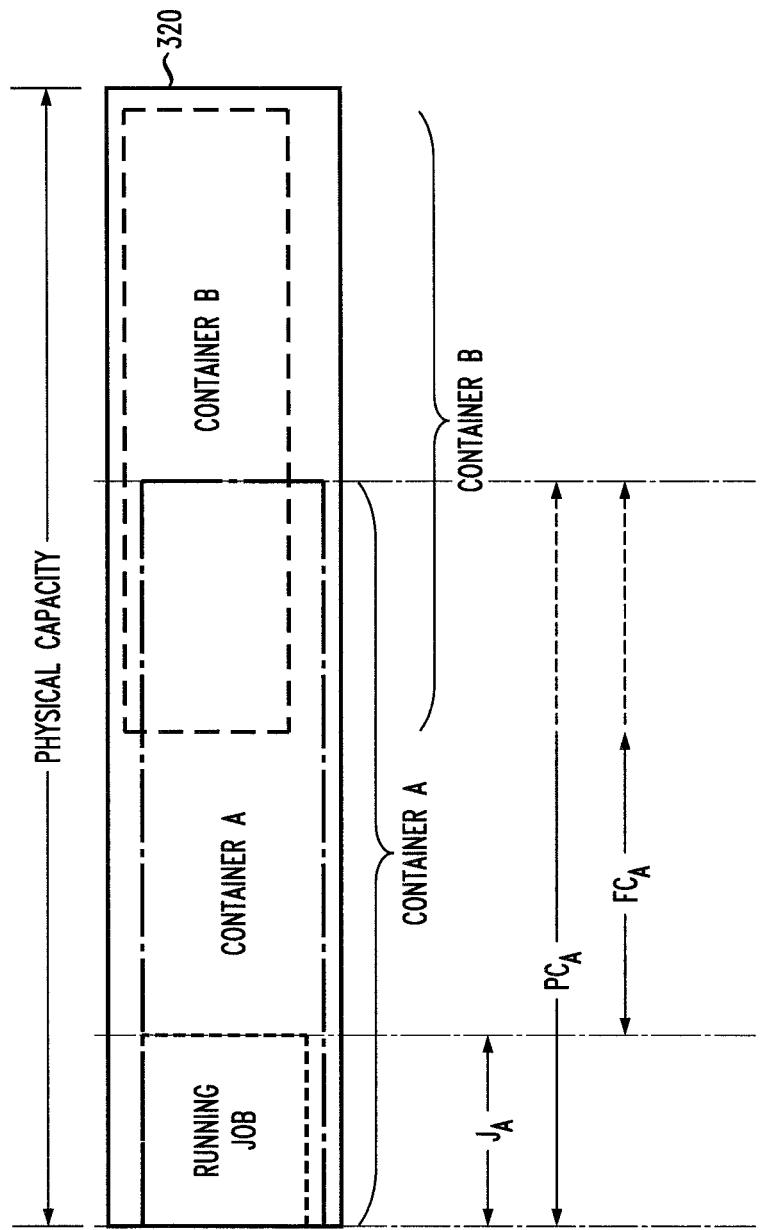
FIG. 3 illustrates various types of container capacity for two exemplary containers.

According to one aspect of the present invention, potential resource capacity is evaluated for systems having a plurality of containers 130, 230. FIG. 3 illustrates various types of container capacity for two exemplary containers A, B. As shown in FIG. 3, a parent container 320 (or platform) having a fixed-size provides a total physical capacity. The total physical capacity is dynamically allocated to containers A and B. There is an exemplary job running on container A. The exemplary job running on container A has a utilization, $J_A$.

The two exemplary containers A, B each have a potential capacity (PC). Container A, for example, has a potential capacity, $PC_A$. As used herein, the potential capacity corresponds to an amount that each container could presently utilize (e.g., a maximum available capacity). The potential capacity depends on the state of the system and how the manager apportions resources during contention. As shown in FIG. 3, the job running on container A consumes an amount of resource, J.

The two exemplary containers A, B have a free capacity (FC). Container A, for example, has a free capacity, $FC_A$. As used herein, the free capacity is the remaining resource in each container up to the potential capacity (e.g., the capacity that is available for new work). Thus, the potential capacity of a container can be expressed as follows:

$$PC = J + FC.$$

The free capacity can thus be calculated from the potential capacity and utilization. It is noted that depending on the system state, the sum of the potential capacity of all containers can exceed the physical capacity of the underlying platform. Generally, the potential capacity of each container A, B is computed from physical capacity, container attributes, state, and utilization across all containers.

The free capacity of each container is often a key parameter in job scheduling algorithms. For example, a representative conventional scheduling method assigns each job to the platform with the greatest free capacity. In this manner, the scheduling provides basic load balancing, distributing jobs among available machines. In the traditional case of scheduling on physical resources, the free capacity of the platform is directly available from utilization monitors. For scheduling on competing containers, however, the free capacity cannot be obtained from the current system state (e.g., utilization of resources in all containers) because the free capacity depends on the rules and policies implemented by the container manager 140, 240.

Calculating Potential Capacity for Virtual Containers

As previously indicated, the present invention provides methods and apparatus for evaluating potential capacity in a system having a plurality of containers 130, 230. According to one aspect of the invention, the potential resource capacity for each container 130, 230 is evaluated, given the current system state and using the rules by which the container manager 140 arbitrates demand among containers 130, 230. This potential capacity is then applied in the job assignment algorithm to choose a container for each job or job element to run. An exemplary algorithm for evaluating the potential capacity of a container 130, 230 is discussed further below in conjunction with FIG. 5.

Estimated Resource Consumption

As each job is allocated to a container 130, 230, the system state changes, which must be taken into account when scheduling the next job. This can be a problem, for example, when a group of jobs is scheduled at once and there is insufficient time to assess the effect of each job placement prior to assigning the next job.

The amount of a given resource that each job consumes during execution may be known, on average. Thus, after a job is allocated to a container, the free usage of the container can be adjusted using the average resource consumption. In one exemplary embodiment, when the average resource consumption is not available, an estimate can be made, for example, based on an average of the recent resource consumption of jobs of that type.

Resource consumption by a job is often variable. Thus, in a further variation, the potential capacity and free capacity are assigned according to the statistical usage of the job and competing jobs on the system. For example, assume the free capacity is at or below a value of 0.8, for 90% of the time.

In yet another variation, when the average resource consumption is not available, a default amount can be employed, for example, based on the equilibrium point capacity.

According to another aspect of the invention, the potential resource capacity for each container 130, 230 is evaluated based on a particular container model of arbitrating resource contention. As used herein, the term "equilibrium resource" indicates the resource each container is allocated in the limit of full contention from all containers. The equilibrium point is an important aspect under full contention. In addition, the equilibrium point is employed for an exemplary algorithm discussed further below in conjunction with FIG. 5 to compute the free capacity based on a set of container attributes that define how the resource is fairly distributed among the containers in situations of full or partial contention.

Resource Allocation with Contending Containers

Figure 4:
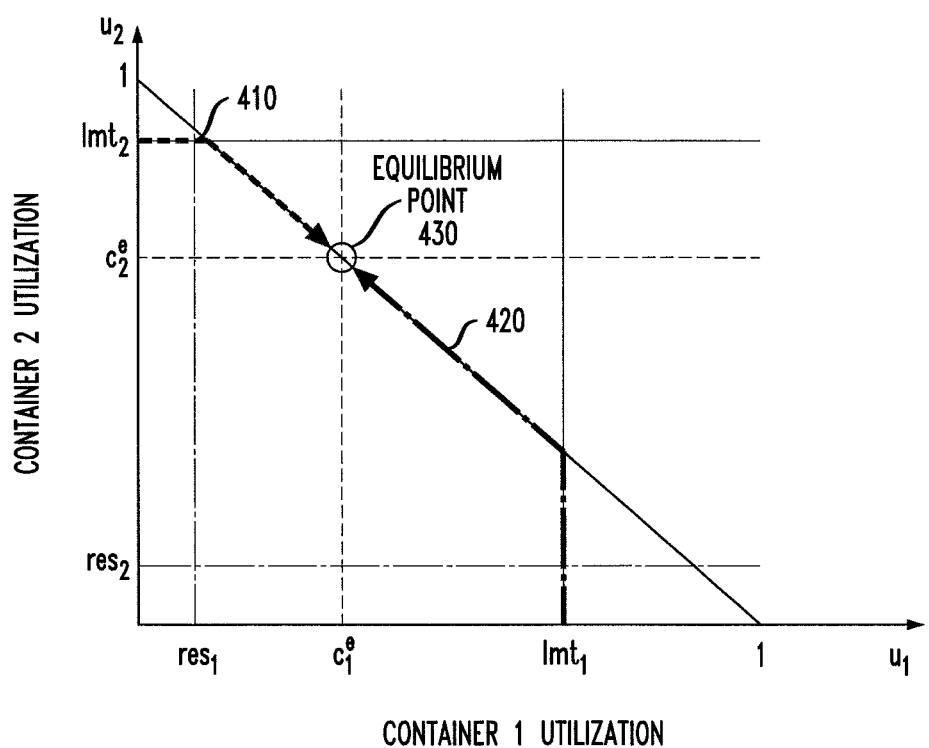
FIG. 4 illustrates the allocation of resources for two exemplary containers in contention.

FIG. 4 illustrates the allocation of resources for two exemplary containers 1, 2 in contention. The utilization, $u_1$, $u_2$, is shown in FIG. 4 on each axis for the respective containers 1, 2, competing for a total capacity of unity (e.g., $u_1+u_2=1$). A first line 410 indicates the potential capacity for utilization $u_2$ as utilization $u_1$ increases along the horizontal axis. Likewise, a second line 420 indicates the corresponding potential capacity for utilization u2. Each container 1, 2 has a corresponding maximum utilization, lmt. In addition, as shown in FIG. 4, each container 1, 2 has a corresponding reserved utilization, res. Further, as shown in FIG. 4, each container 1, 2 has a corresponding potential capacity, $c_i$.

The intersection of the two potential capacities, $c_i$ ($c_1=c_2$), is the equilibrium point 430, where the system state converges under full contention. In other words, the equilibrium point 430 is where both containers 1, 2 attempt to use more than their respective equilibrium point 430 of resource. The equilibrium point 430 is useful for partitioning states of the system according to whether utilization of each container is above or below its equilibrium point.

Generally, container 1 starts at a maximum utilization, lmt1. As container 2 draws utilization, both containers move to the equilibrium point 430. As discussed hereinafter, the equilibrium point 430 divides the space into four regions.

Potential Capacity Evaluation Process

FIG. 5 illustrates exemplary pseudo code for an embodiment of a potential capacity evaluation process 500 incorporating features of the present invention. Generally, the exemplary potential capacity evaluation process 500 evaluates the potential capacity of containers 130, 230. As shown in FIG. 5, an index, idx, indicating the current container; the total physical capacity, pCap, of the platform; an array, $u_i$, indicating the current utilization of each container, i; an array, res, indicating the reserve (minimum) capacity of each container, i; an array, $lmt_i$, indicating the maximum capacity of each container, i; and an array, $w_i$, indicating the weight or relative share of each container, i, are passed to the exemplary potential capacity evaluation process 500 during step 1.

The equilibrium capacities ($c_i^e$) are computed for each container during step 2, based on the container attributes and apportioning capacity above the container minimum according to the assigned shares. A utilization variable, $u_{idx}$, for the current container is initialized during step 3 (for example, to infinity).

The potential capacity evaluation process 500 will calculate the potential dynamic capacity, $c_{idx}$, of the current member as follows. In the exemplary embodiment, the potential capacity evaluation process 500 separates the member containers into two groups during step 4. A first group, workG, is comprised of members whose utilization exceeds the assigned global equilibrium capacity, as well as the current member. The second group, unchgG, is comprised of the remaining members. In the exemplary embodiment, capacity is taken from one or more members of the first group (because they are using more than they are entitled to).

A loop from steps 4 through 9 is entered and repeated until no member moves from one group to the other group (as detected in step 9). During step 6, the potential capacities are re-computed for the first group, while maintaining the potential capacities for the second group. In this manner, the available capacity of the first (overutilized) group (relative to equilibrium capacity) is computed as the difference between the total capacity, pCap, and the sum of capacity of members in the second (underutilized) group.

An incremental group, incG, is employed during steps 7 and 8 to move members of the overutilized group whose utilization is smaller than its equilibrium capacity (i.e., how much capacity the container is entitled to) to the underutilized group (except the current member).

If it is determined during step 10 that the current member is still in the overutilized group, then the potential capacity of the current member is returned during step 11 based on the container attributes and the capacity is apportioned according to shares.

If, however, it is determined during step 10 that the current member is not in the overutilized group, then the potential capacity of the current member is returned during step 13. The potential capacity evaluation process 500 is further discussed hereinafter in conjunction with the example of FIG. 6.

FIG. 6 provides an example 600 of how equilibrium, potential and free capacity are evaluated for an exemplary set of three containers (virtual machines) VM1 through VM3. As shown in FIG. 6, the reservation, share and current utilization of each container VM1-VM3 are indicated in the first three records 610, 620, 630. As indicated above, the share is the relative weight of each container used to apportion the resource(s) in contention.

Record 640 corresponds to the calculation of the equilibrium capacity for all three containers VM1 through VM3, as determined during line 6 of the potential capacity evaluation process 500. This results in the equilibrium capacity, $c_i^e$, which is what each container VM1 through VM3 receives if they individually try to obtain as much resource as possible. Here, there is a total physical capacity of unity and each container has a reservation of 0.3. Thus, there is 0.1 left to share in proportion to the container weights. Thus, each container in equilibrium receives its reservation of 0.3 plus its share of the 0.1.

For example, container VM2 has been assigned two shares out of a total six shares. Thus, the equilibrium capacity for container VM2 is computed in record 640 by summing the minimum reserve for container VM2 (0.3) with a pro-rated (based on the assigned share) portion of the remaining physical capacity after the total reserve (i.e., a total physical capacity of unity less the total reserve assigned to all containers (0.3 per container)).

As discussed above in conjunction with FIG. 5, the equilibrium capacity is computed in a loop at step 6, until no member moves from one group to the other group. For container VM1, the calculation of equilibrium capacity is complete following the initial calculation shown in record 640, as the current utilization (record 630) for both containers VM2 and VM3 are below the determined equilibrium capacity (and thus capacity of containers VM2 and VM3 cannot be reassigned to container VM1). For example, the current utilization in record 630 for container VM2 of 0.3 is below the corresponding determined equilibrium capacity of 0.333, as set forth in record 640 for container VM2.

For container VM2, the calculation of equilibrium capacity continues during a second iteration of the loop in the potential capacity evaluation process 500, as shown in record 650. Since the current utilization (record 630) for container VM3 is below the determined equilibrium capacity for container VM3 in record 640, the capacity of container VM3 cannot be reassigned to container VM2. Thus, container VM3 is removed from consideration in record 650 when computing the equilibrium capacity for container VM2. Thus, the current utilization of container VM3 is removed from the available physical capacity, leaving an effective physical capacity to be allocated in record 650 among containers VM1 and VM2 of 0.75. The current utilization of container VM1 exceeds its equilibrium capacity, so container VM2 is entitled to compete with container VM1. Consequently, containers VM1 and VM2 compete for resources above their own reservations of 0.3 and VM3's current utilization of 0.25.

As shown in record 650, the equilibrium capacity for container VM2 is computed by summing the minimum reserve for container VM2 (0.3) with a pro-rated (based on the assigned share for considered containers VM1 and VM2) portion of the remaining physical capacity after the total reserve (i.e., a total physical capacity of 0.75 available to considered containers VM1 and VM2 less the total reserve assigned to considered containers VM1 and VM2 (0.3 per container)). The result of record 650 is that a job in container VM2 can potentially obtain 0.4 of the platform resource. The resulting potential capacity of container VM2 is listed in record 670.

Likewise, for container VM3, the calculation of equilibrium capacity continues during another iteration of the loop, as shown in record 660. Since the current utilization (record 630) for container VM2 is below the determined equilibrium capacity for container VM2 in record 640, the capacity of container VM2 cannot be reassigned to container VM3. Thus, container VM2 is removed from consideration in record 660 when computing the equilibrium capacity for container VM3. Thus, the current utilization of container VM2 is removed from the available physical capacity, leaving an effective physical capacity to be allocated in record 660 among containers VM1 and VM3 of 0.7. As shown in record 660, the equilibrium capacity for container VM3 is computed by summing the minimum reserve for container VM3 (0.3) with a pro-rated (based on the assigned share for considered containers VM1 and VM3) portion of the remaining physical capacity after the total reserve (i.e., a total physical capacity of 0.7 available to considered containers VM1 and VM3 less the total reserve assigned to considered containers VM1 and VM3 (0.3 per container)). Container VM3 is guaranteed a reserve capacity of 0.3. Thus, the utility to be shared is 0.1 (1−0.3−0.3−0.3). This leads to a Potential Capacity of 0.375 for VM3.

The potential capacity and free capacity for each container VM1 through VM3 are indicated in records 670, 680.

Figure 7:
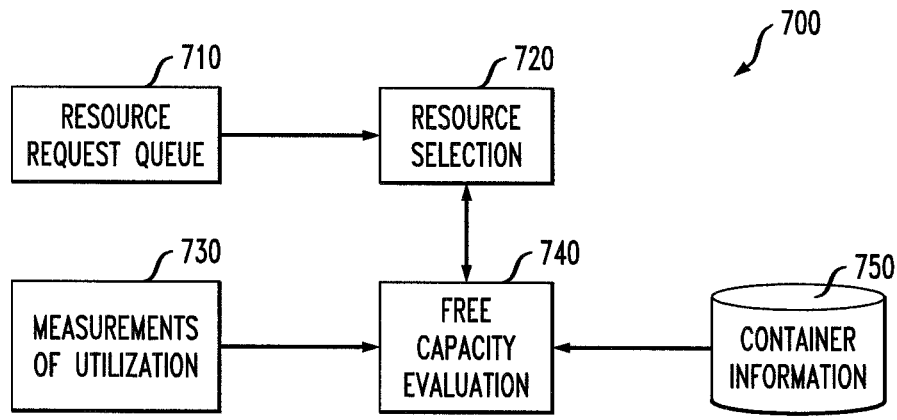
FIG. 7 is a schematic block diagram of an apparatus that evaluates free capacity in accordance with the present invention.

FIG. 7 is a schematic block diagram of an apparatus 700 that evaluates free capacity in accordance with the present invention. As shown in FIG. 7, a free capacity evaluation block 740 obtains measurements of utilization from block 730 and container information (such as attributes and policies) from a data store 750. These values are processed, for example, by the potential capacity evaluation process 500 of FIG. 5, to allocate resources 720, based on requests in a queue 710.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
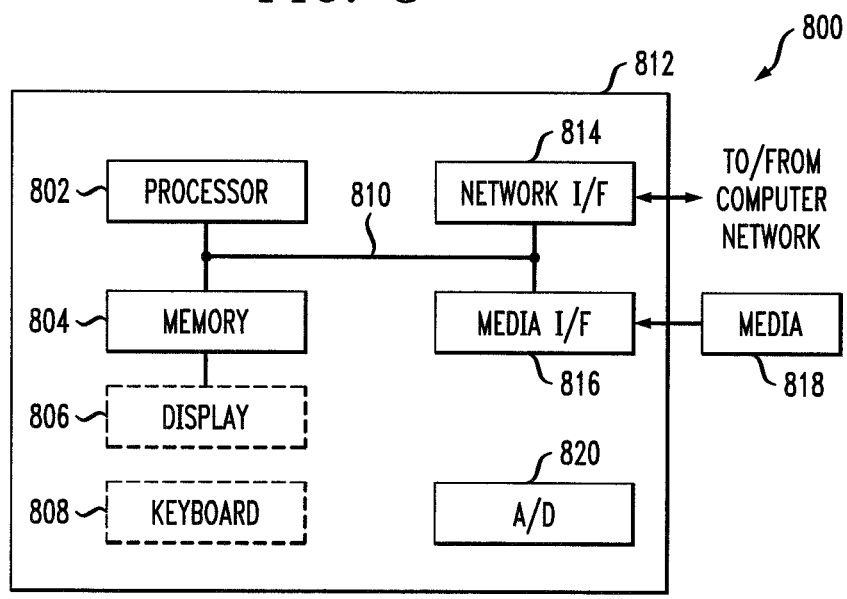
FIG. 8 depicts a computer system that may be useful in implementing one or more aspects and/or elements of the present invention.

One or more embodiments can make use of software running on a general purpose computer or workstation. FIG. 8 depicts a computer system 800 that may be useful in implementing one or more aspects and/or elements of the present invention. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Analog-to-digital converter(s) 820 may be provided to receive analog input, such as analog video feed, and to digitize same. Such converter(s) may be interconnected with system bus 810.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is anon-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 802. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a free capacity of at least one container in a plurality of containers competing for a total capacity of a larger container, said method comprising:
    obtaining a current utilization by each of said plurality of competing containers;
    determining a first individual equilibrium capacity value for each of said plurality of competing containers by summing a minimum resource allocation amount corresponding to the given container and a portion of remaining available resource allocation, wherein said portion is pro-rated based on a relative resource weight of the given container;
    determining an updated individual equilibrium capacity value for each of said plurality of competing containers with a current utilization that is less than the first individual equilibrium capacity value by summing the minimum resource allocation amount corresponding to the given container and a portion of remaining available resource allocation among (i) each of said plurality of competing containers having a current utilization that is greater than the first individual equilibrium capacity value and (ii) the given container, wherein said portion is pro-rated based on a relative resource weight of the given container;
    determining an individual free capacity for each of said plurality of competing containers associated with each container, wherein said determining an individual free capacity for a given container comprises:
        for each of said plurality of competing containers with a current utilization that is less than the first individual equilibrium capacity value, subtracting the current utilization associated with the given container from the updated equilibrium capacity associated with the given container; and
        for each of said plurality of competing containers with a current utilization that is greater than the first individual equilibrium capacity value, subtracting the current utilization associated with the given container from the difference of the total capacity less the current utilization of each of said plurality of competing containers excluding the given container; and
    allocating resources to the plurality of the competing containers based on the determined free capacity for each of the plurality containers;
    wherein said obtaining, said determining the individual equilibrium capacity, said determining the individual free capacity, and said allocating are carried out by a computing device.

2. The method of claim 1, wherein said obtaining step further comprises the step of obtaining a minimum capacity for each of said plurality of containers.

3. The method of claim 2, wherein capacity above said minimum capacity is apportioned according to said relative weight.

4. The method of claim 1, wherein said obtaining step further comprises the step of obtaining a maximum capacity.

5. The method of claim 1, further comprising a plurality of said larger containers within a second larger parent container.

6. The method of claim 1, further comprising the step of separating said plurality of containers into at least two groups, wherein an overutilized group comprises containers having a utilization that exceeds a global equilibrium capacity.

7. The method of claim 1, further comprising the step of moving members of said overutilized group having a utilization below a threshold to said underutilized group.

8. An apparatus for determining a free capacity of at least one container in a plurality of containers competing for a total capacity of a larger container, said apparatus comprising:
    a memory; and
    at least one processor, coupled to the memory, operative to:
        obtain a current utilization by each of said plurality of competing containers;
        determine a first individual equilibrium capacity value for each of said plurality of competing containers by summing a minimum resource allocation amount corresponding to the given container and a portion of remaining available resource allocation, wherein said portion is pro-rated based on a relative resource weight of the given container;
        determine an updated individual equilibrium capacity value for each of said plurality of competing containers with a current utilization that is less than the first individual equilibrium capacity value by summing the minimum resource allocation amount corresponding to the given container and a portion of remaining available resource allocation among (i) each of said plurality of competing containers having a current utilization that is greater than the first individual equilibrium capacity value and (ii) the given container, wherein said portion is pro-rated based on a relative resource weight of the given container;
        determine an individual free capacity for each of said plurality of competing containers associated with each container, wherein said determining an individual free capacity for a given container comprises:
            for each of said plurality of competing containers with a current utilization that is less than the first individual equilibrium capacity value, subtracting the current utilization associated with the given container from the updated equilibrium capacity associated with the given container; and
            for each of said plurality of competing containers with a current utilization that is greater than the first individual equilibrium capacity value, subtracting the current utilization associated with the given container from the difference of the total capacity less the current utilization of each of said plurality of competing containers excluding the given container; and
        allocate resources to the plurality of the competing containers based on the determined free capacity for each of the plurality containers.

9. The apparatus of claim 8, wherein said wherein said processor is further configured to obtain a minimum capacity for each of said plurality of containers.

10. The apparatus of claim 9, wherein capacity above said minimum capacity is apportioned according to said relative weight.

11. The apparatus of claim 8, further comprising a plurality of said larger containers within a second larger parent container.

12. The apparatus of claim 8, wherein said processor is further configured to separate said plurality of containers into at least two groups, wherein an overutilized group comprises containers having a utilization that exceeds a global equilibrium capacity.

13. The apparatus of claim 12, wherein said processor is further configured to move members of said overutilized group having a utilization below a threshold to said underutilized group.

14. An article of manufacture for determining a free capacity of at least one container in a plurality of containers competing for a total capacity of a larger container, said article of manufacture comprising a non-transitory machine readable recordable storage medium containing one or more programs which when executed implement the steps of:
  obtaining a current utilization by each of said plurality of competing containers;
  determining a first individual equilibrium capacity value for each of said plurality of competing containers by summing a minimum resource allocation amount corresponding to the given container and a portion of remaining available resource allocation, wherein said portion is pro-rated based on a relative resource weight of the given container;
  determining an updated individual equilibrium capacity value for each of said plurality of competing containers with a current utilization that is less than the first individual equilibrium capacity value by summing the minimum resource allocation amount corresponding to the given container and a portion of remaining available resource allocation among (i) each of said plurality of competing containers having a current utilization that is greater than the first individual equilibrium capacity value and (ii) the given container, wherein said portion is pro-rated based on a relative resource weight of the given container;
  determining an individual free capacity for each of said plurality of competing containers associated with each container, wherein said determining an individual free capacity for a given container comprises:
    for each of said plurality of competing containers with a current utilization that is less than the first individual equilibrium capacity value, subtracting the current utilization associated with the given container from the updated equilibrium capacity associated with the given container; and
    for each of said plurality of competing containers with a current utilization that is greater than the first individual equilibrium capacity value, subtracting the current utilization associated with the given container from the difference of the total capacity less the current utilization of each of said plurality of competing containers excluding the given container; and
  allocating resources to the plurality of the competing containers based on the determined free capacity for each of the plurality containers.

* * * * *